(12) United States Patent
Chan et al.

(10) Patent No.: US 11,416,083 B2
(45) Date of Patent: Aug. 16, 2022

(54) KEYBOARD OVERLAY FILM WITH TOUCH AND/OR BACKLIGHT FUNCTION

(71) Applicant: Darfon Electronics Corp., Taoyuan (TW)

(72) Inventors: Chin-Lung Chan, Taoyuan (TW); Wei-Yan You, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/564,316

(22) Filed: Dec. 29, 2021

(65) Prior Publication Data

US 2022/0206589 A1 Jun. 30, 2022

Related U.S. Application Data

(60) Provisional application No. 63/131,362, filed on Dec. 29, 2020.

(30) Foreign Application Priority Data

Sep. 24, 2021 (TW) ................................ 110135684

(51) Int. Cl.
*G06F 3/023* (2006.01)
*G06F 3/044* (2006.01)
*F21V 8/00* (2006.01)

(52) U.S. Cl.
CPC .............. *G06F 3/023* (2013.01); *G02B 6/006* (2013.01); *G06F 3/044* (2013.01)

(58) Field of Classification Search
CPC ........... G02B 6/006; G06F 3/023–0238; G06F 3/044
See application file for complete search history.

(56) References Cited

U.S. PATENT DOCUMENTS

| | | | | |
|---|---|---|---|---|
| 9,829,990 | B2* | 11/2017 | Huang | G06F 3/0219 |
| 2011/0216007 | A1* | 9/2011 | Cheng | G06F 3/0488 |
| | | | | 345/168 |
| 2011/0274475 | A1* | 11/2011 | Hung | G06F 3/0238 |
| | | | | 400/484 |
| 2013/0156482 | A1* | 6/2013 | Kaliebe | G06F 3/0202 |
| | | | | 29/428 |
| 2013/0257726 | A1* | 10/2013 | Herrmann | H04M 1/23 |
| | | | | 345/169 |
| 2014/0133182 | A1* | 5/2014 | Yao | H01H 13/83 |
| | | | | 427/523 |

(Continued)

*Primary Examiner* — Michael Pervan
(74) *Attorney, Agent, or Firm* — McClure, Qualey & Rodack, LLP

(57) ABSTRACT

A keyboard overlay film forming a plurality of keycap accommodating cavities and a key-gap space, the key-gap space surrounding the keycap accommodating cavities, and the keycap accommodating cavities respectively including a key projection surface, wherein the keyboard overlay film includes a top protective layer; a character layer located on a side of the top protective layer forming the keycap accommodating cavities, and the character layer includes a plurality of light-transparent characters respectively corresponding to the key projection surface of the keycap accommodating cavities; a set of touch electrodes located on a side of the character layer opposite to the top protective layer; and a lower protective layer located on a side of the set of touch electrodes opposite to the character layer.

20 Claims, 9 Drawing Sheets

(56) References Cited

U.S. PATENT DOCUMENTS

2015/0103055 A1* 4/2015 Kreiner ............... H04B 5/0062
            345/178
2016/0239100 A1* 8/2016 Huang ................ G06F 3/0202

* cited by examiner

KEYBOARD OVERLAY FILM WITH TOUCH AND/OR BACKLIGHT FUNCTION

BACKGROUND OF THE INVENTION

1. Field of the Invention

Aspects of the disclosure relate to a keyboard overlay film. Specifically, the aspects of the disclosure relate to a keyboard overlay film having a set of touch electrodes and a backlight circuit.

2. Description of the Prior Art

As a tool for users to input text signals, the keyboard is easy to accumulate dirt in use, and it is also a way for foreign matter and moisture to easily enter the device. Therefore, there are many keyboard overlay films for dust and water resistance on the market. However, most devices still rely on the touchpad to transmit the touch signal of the user in order to achieve the touch function. Similarly, to achieve the backlight function, most of them rely on the built-in light source of the keyboard. However, the functions of the touchpad and the keyboard must be added in the product design stage, and it is difficult to add those functions to the existing device after the product is manufactured.

SUMMARY OF THE INVENTION

It is an object of the invention to provide a keyboard overlay film with touch function and/or backlight function, which users can quickly and simply integrate on the existing keyboard of device.

It is an object of the invention to provide a keyboard overlay film with touch function and/or backlight function, which can provide touch signals generated through the keyboard overlay film by users in addition to dustproof and waterproof functions.

It is an object of the invention to provide a keyboard overlay film with touch function and/or backlight function, which can provide light emitting through characters on the keyboard overlay film to facilitate the operation of the keyboard in a dim environment.

In an embodiment, the keyboard overlay film forming a plurality of keycap accommodating cavities and a key-gap space, the key-gap space surrounding the keycap accommodating cavities, and the keycap accommodating cavities respectively including a key projection surface, wherein the keyboard overlay film includes a top protective layer; a character layer located on a side of the top protective layer forming the keycap accommodating cavities, and the character layer includes a plurality of light-transparent characters respectively corresponding to the key projection surface of the keycap accommodating cavities; a set of touch electrodes located on a side of the character layer opposite to the top protective layer; and a lower protective layer located on a side of the set of touch electrodes opposite to the character layer. With this structure, the keyboard overlay film can be easily combined with the keyboard, and the set of touch electrodes can provide control signals the generated through the keyboard overlay film by user's non-pressing operation.

In another embodiment, the keyboard overlay film forming a plurality of keycap accommodating cavities and a key-gap space, the key-gap space surrounding the keycap accommodating cavities, and the keycap accommodating cavities respectively including a key projection surface, wherein the keyboard overlay film includes a top protective layer; a shading layer located on a side of the top protective layer forming the keycap accommodating cavities, and the shading layer includes a plurality of light-transparent characters respectively corresponding to the key projection surfaces of the keycap accommodating cavities; a backlight layer located on a side of the shading layer opposite to the top protective layer, wherein when the backlight layer provides light, the light emits through the light-transparent characters of the shading layer; and a lower protective layer located on a side of the backlight layer opposite to the shading layer. With this structure, the keyboard overlay film can be easily combined with the keyboard, and the backlight circuit can provide light emitting through the light-transparent characters on the shading layer, so as to facilitate the operation of the keyboard in a dim environment.

In summary, the present invention enables the touch and/or backlight functions for the keyboard overlay film to by arranging the set of touch electrodes and/or the backlight layer in the keyboard overlay film, so that it can be conveniently combined with the existing keyboard products, and provide the touch function and backlight function for the existing keyboard product which did not originally have the functions.

In order to enable those skilled in the art to further understand the features and technology of the present invention, a detailed description will be given below with reference to the drawings. However, the drawings provided herein are only illustrative diagrams, and are not intended to limit the present invention.

BRIEF DESCRIPTION OF THE APPENDED DRAWINGS

DETAILED DESCRIPTION OF THE INVENTION

Hereinafter, the keyboard overlay film with touch and/or backlight function disclosed in the present disclosure will be described through specific embodiments. Those skilled in the art should understand the configuration and utility of the present invention from the content disclosed in this specification. However, the content described below is only intended to enable those skilled in the art to understand the technical features of the present invention, and is not intended to limit the protection scope of the present invention. Those skilled in the art should be able to implement the present invention in different embodiments without departing from the spirit of the present invention.

Figure 1:
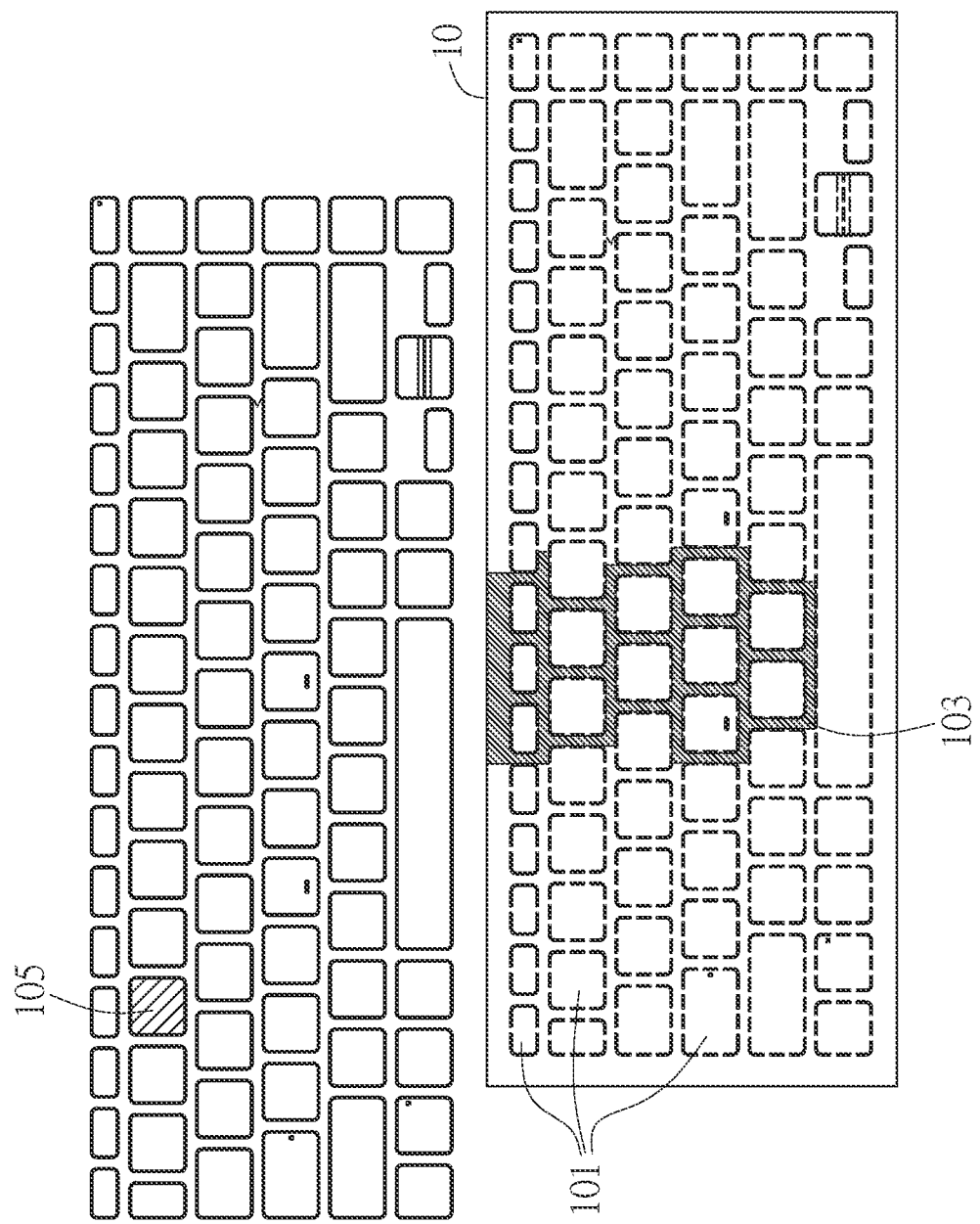
FIG. 1 is a schematic view of the structure of the keyboard overlay film according to an embodiment of the present invention.

Referring to FIG. 1 to illustrates an embodiment of the keyboard overlay film 10 of the present invention, the keyboard overlay film 10 can cover the upper surface of each keycap on the keyboard module of the notebook computer, or the upper surface of each keycap on the separate wired or wireless keyboard. The keyboard overlay film 10 forms a plurality of keycap accommodating cavities 101 and key-gap spaces 103. The keycap accommodating cavities 101 each is defined by a set of front, rear, left, right, and upper walls of the keyboard overlay film 10 corresponding to a single key (not shown in the figure). That is, each set of front, rear, left, right, and upper walls of the keyboard overlay film 10 forms a keycap accommodating portion, which defines the keycap accommodating cavity 101 with a shape and space corresponding to one of the keycaps. The keycap accommodating portion has a convex surface upwards and a concave surface downwards to define the keycap accommodating cavity 101 almost of a hexahedron. Each of the aforementioned keys and their keycaps is accommodated or received in the corresponding keycap accommodating cavity 101 with the keycap accommodating portions covers thereon. The key-gap space 103 corresponds to the gap between each key and its front, rear, left, and right adjacent keys. The key-gap space 103 is defined by a portion (e.g., key-gap portion) of the keyboard overlay film 10 corresponding to the adjacent sidewalls of the adjacent keys. The key-gap space 103 surrounds the keycap accommodating cavities 101. The keycap accommodating cavities 101 respectively include a key projection surface 105, and the key projection surface 105 can be realized, for example, by the aforementioned upper wall of the keyboard overlay film 10. Specifically, the standard keyboard includes keycaps of different sizes, such as single-size keys printed with numbers or English letters, function keys printed with F1-F12, and multiple-size key such as Space/Enter/Shift/CapsLock/Ctrl keys etc. In addition, the keycaps on the keyboard also have different arrangements. For example, some single-size keys are arranged in parallel, while single-size keys in different rows are arranged in a staggered manner. Therefore, in order to be combined with the keyboard, the keyboard overlay film 10 is also formed with a plurality of keycap accommodating cavities 101 according to the size and arrangement of the keycaps, wherein different keycap accommodating cavities 101 may accommodate keycaps of different sizes. When the keyboard overlay film is combined with the keyboard, the positions of the keycap accommodating cavities 101 can respectively correspond to the corresponding keycaps, and at least part of the key projection surface 105 contacts the top surface of the keycap (for example, the projection of the key projection surface 105 on the keycap can cover the range of characters (e.g., numbers, English letters, etc.) printed on the keycap). The key-gap space 103 is the part of the keyboard overlay film 10 that does not form the keycap accommodating cavities 101, and when the keyboard overlay film is combined with the keyboard, at least part of the key-gap space 103 fills the gap between the keycaps to increase the fitness of the keyboard overlay film and the keyboard.

Figure 2:
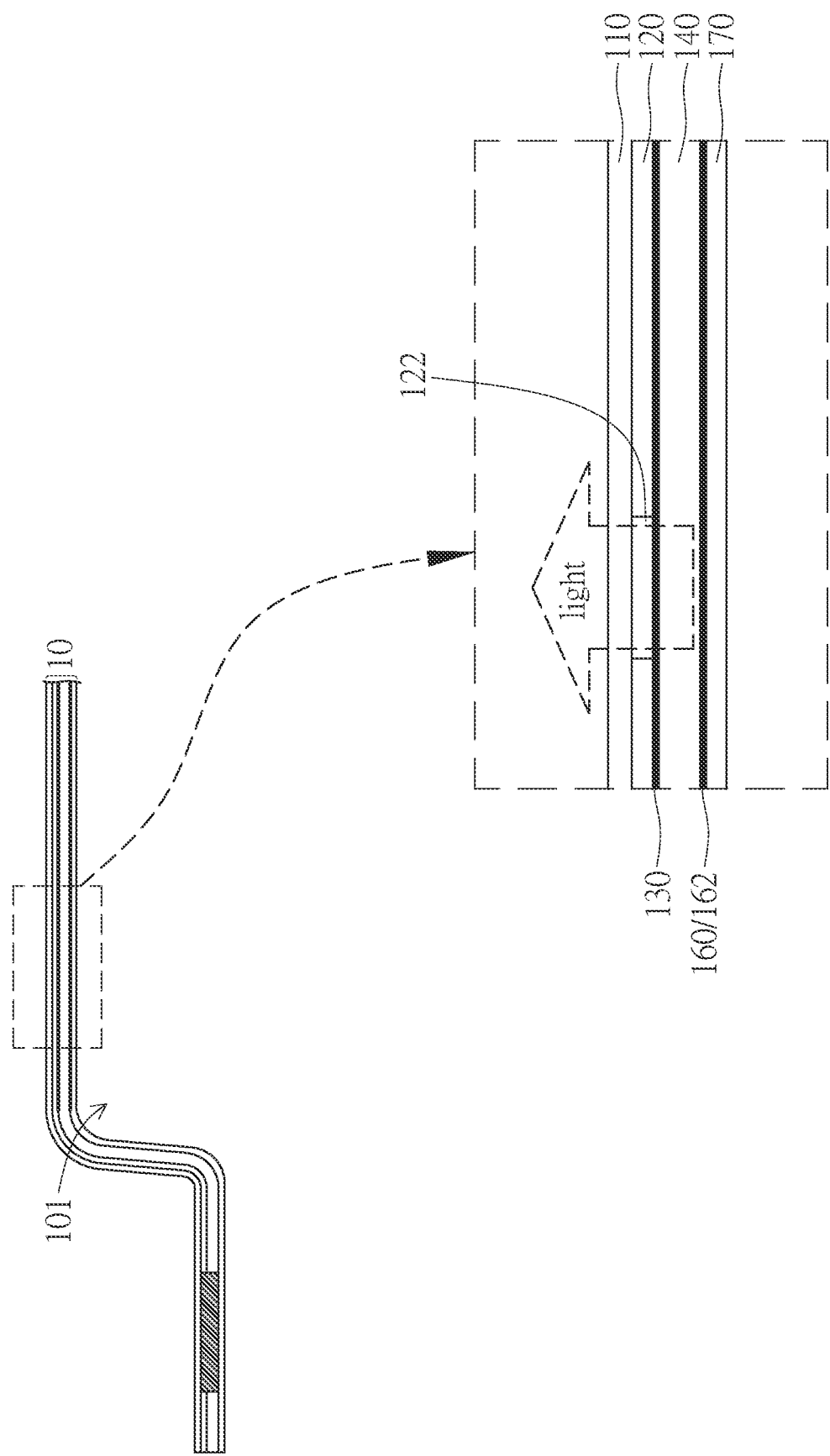
FIG. 2 is a schematic cross-sectional view of the keyboard overlay film according to an embodiment of the present invention.

Referring to FIG. 2 to illustrate the keyboard overlay film 10 of an embodiment of the present invention. FIG. 2 is a schematic cross-sectional view of the keycap accommodating cavity 101. The present embodiment is described from top to bottom. The keyboard overlay film 10 includes a top protective layer 110, a shading layer 120, a set of touch electrodes 130, an insulating layer 140, a backlight layer 160, and a lower protective layer 170. The top protective layer 110 and the lower protective layer 170 are the surfaces of the keyboard overlay film 10 in contact with the external environment, and at the same time are the surfaces in contact with the keyboard or the user's fingers. Therefore, the top protective layer 110 and the lower protective layer 170 can be made of transparent materials with waterproof and dirt-resistant effect (such as elastic materials like silicone or thermoplastic polyurethane (TPU)). The shading layer 120 is located under the top protective layer 110 and includes a plurality of light-transparent characters 122. The shading layer 120 can be used to determine the luminous characters of the keyboard overlay film 10 through the light-transparent characters 122. That is, when the backlight layer 160 provides a light, the user can see the light emitting from the light-transparent character 122 (described in detail with reference to FIG. 3). The set of touch electrodes 130 is located between the shading layer 120 and the insulating layer 140. In this embodiment, the set of touch electrodes 130 can be printed on the side of the insulating layer 140 facing the shading layer 120. In other embodiments, the set of touch electrodes 130 can be printed on the side of the shading layer 120 facing the insulating layer 140.

Referring to FIG. 2 to continue to illustrate the keyboard overlay film 10 of an embodiment of the present invention, wherein the insulating layer 140 is located between the set of touch electrodes 130 and the backlight layer 160. The insulating layer 140 can provide an insulating effect to prevent unnecessary interference between the set of touch electrodes 130 and the backlight layer 160. The backlight layer 160 is located between the insulating layer 140 and the lower protective layer 170. In this embodiment, the backlight layer 160 is composed of a backlight circuit 162, and the backlight circuit 162 can be printed on the side of the insulating layer 140 facing the lower protective layer 170. In other embodiments, the backlight circuit 162 may be printed on the side of the lower protection layer 170 facing the insulating layer 140.

Figure 3:
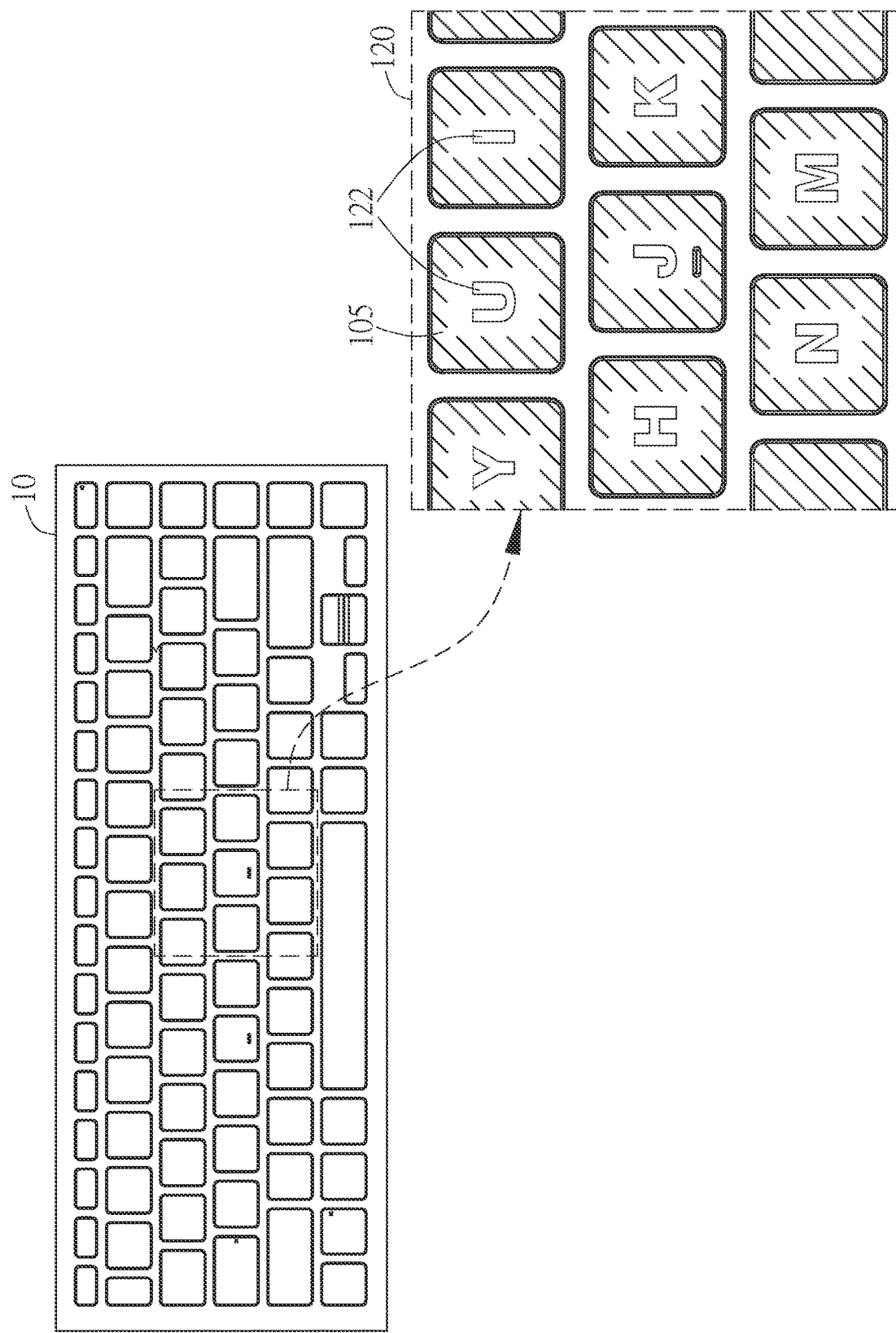
FIG. 3 is a schematic view of the light-transparent characters in the keyboard overlay film according to an embodiment of the present invention.

Referring to FIG. 3 to illustrate the keyboard overlay film 10 of an embodiment of the present invention. The shading layer 120 includes a plurality of light-transparent characters 122 corresponding to the key projection surfaces 105, respectively. That is, the light-transparent characters 122 are respectively arranged in the range corresponding to the key projection surfaces 105. The shading layer 120 is coated with a coating (such as ink) that prevents light from emitting therethrough. The light-transparent characters 122 can be, for example, the parts of the shading layer 120 that are not coated with the coating, such as characters left out by laser engraving or screen printing. In addition, the light-transparent character 122 is located within the range of the corresponding key projection surface 105. However, the formation of the light-transparent character 122 is not limited to this. The typefaces of the light-transparent characters 122 are preferably the same as the characters printed on the keycaps of the keyboard (i.e., numbers, English letters, F1-F12, Enter, Shift, etc.). When the keyboard overlay film 10 is combined with the keyboard, the typefaces of the light-transparent characters 122 are the same as the characters of the keycap covered by the corresponding key projection surface 105. With this configuration, when the backlight layer 160 provides a light, the light will emit through the light-transparent characters 122 that have not been coated with light-shielding coating, so that the user can still recognize the characters and input the text signal correctly in a dark environment.

Figure 4:
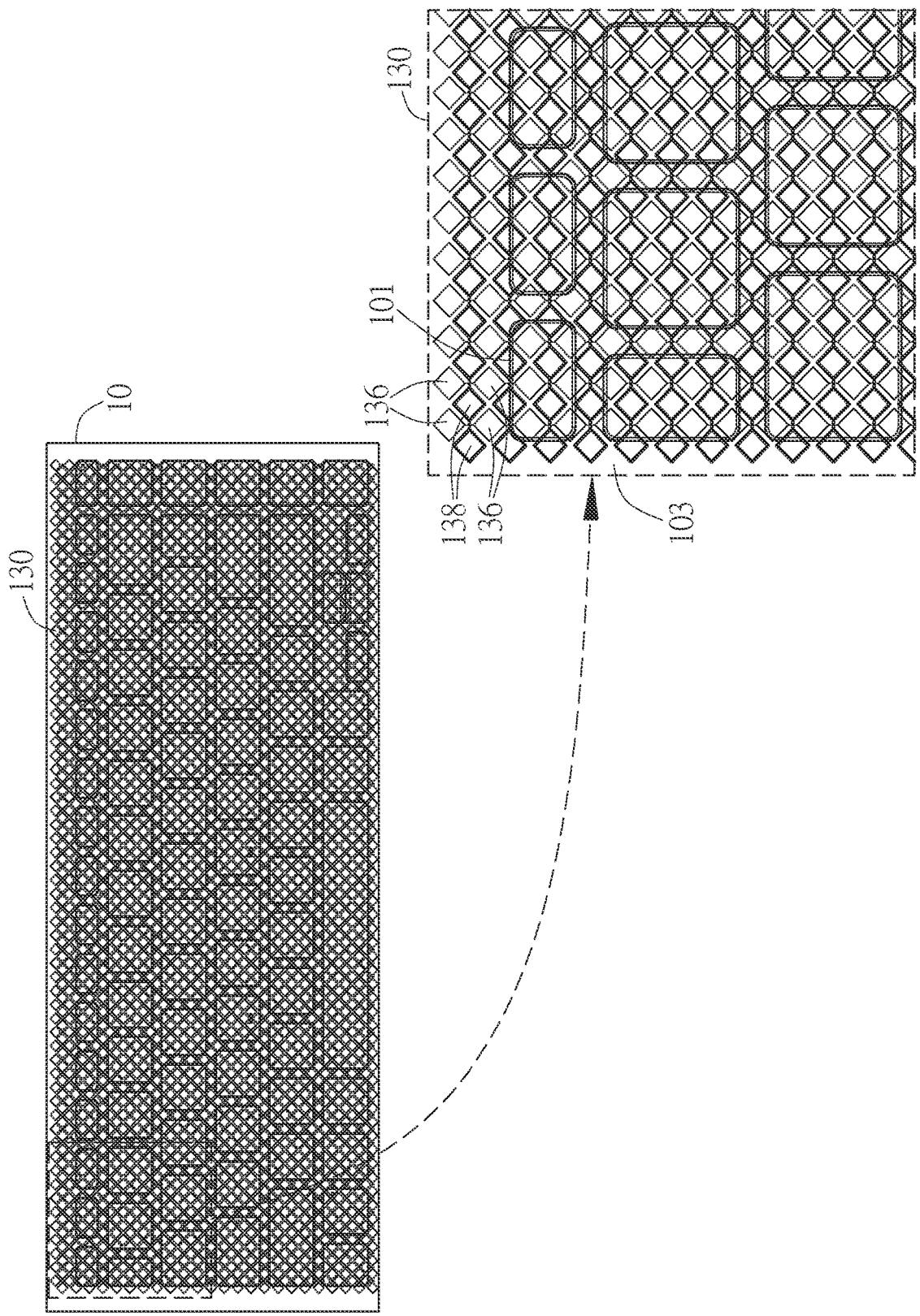
FIG. 4 is a schematic view of the set of touch electrodes of the keyboard overlay film according to an embodiment of the present invention.
Figure 6:
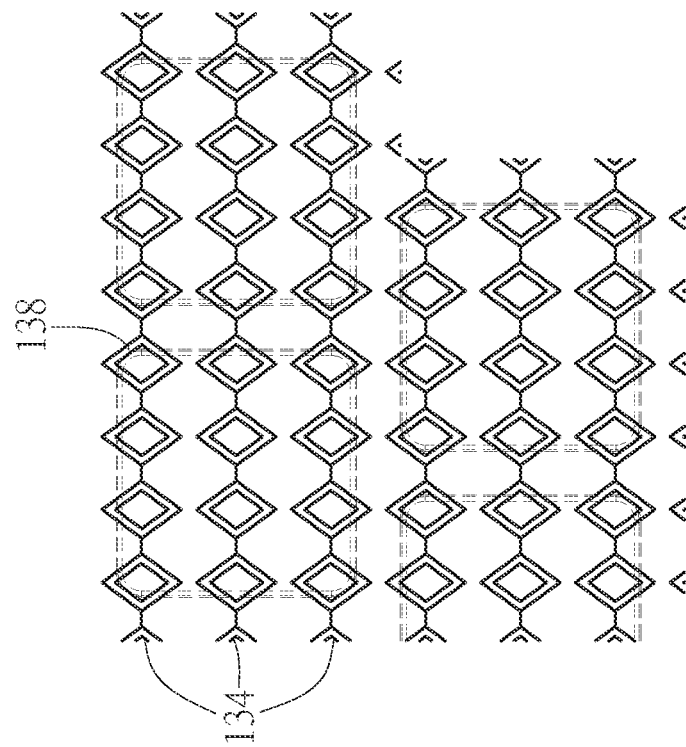
FIG. 6 is an enlarged schematic view of the second electrode series in the keyboard overlay film according to an embodiment of the present invention.
Figure 5:
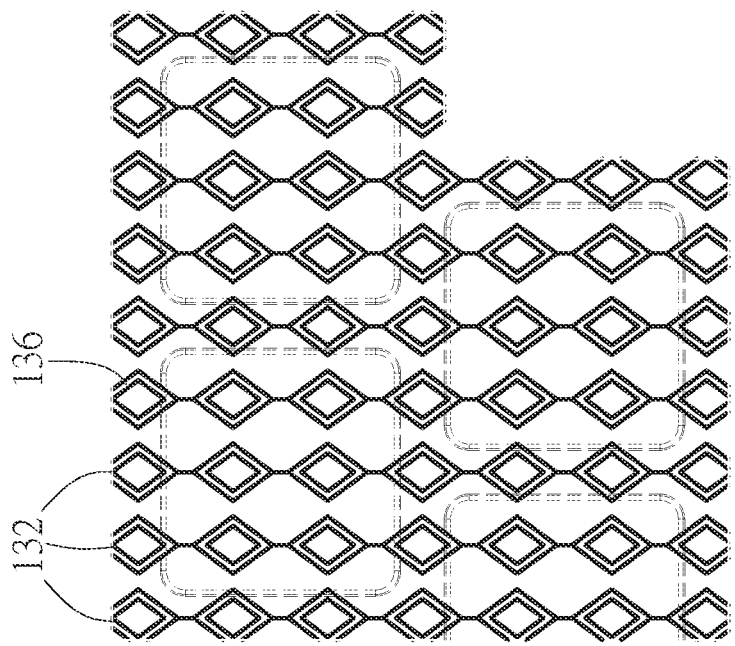
FIG. 5 is an enlarged schematic view of the first electrode series in the keyboard overlay film according to an embodiment of the present invention.

Referring to FIG. 4, FIG. 5 and FIG. 6 to illustrate the set of touch electrodes 130 of the keyboard overlay film 10 according to an embodiment of the present invention. The set of touch electrodes 130 is distributed in the keycap accommodating cavities 101 and at least part of the key-gap space 103. The set of touch electrodes 130 includes a plurality of first electrodes 136 in a rhombus shape and a plurality of second electrodes 138 in a rhombus shape. The first electrodes 136 are connected in series along a vertical direction to form a plurality of first electrode series 132 (as shown in FIG. 5). The plurality of second electrodes 138 are connected in series along the lateral direction to form a plurality of second electrode series 134 (as shown in FIG. 6). The plurality of first electrode series 132 and the plurality of second electrode series 134 are staggered arranged with each other, so that four adjacent first electrodes 136 surround one second electrode 138, and four adjacent second electrodes 138 surround one first electrode 136, thereby enhancing the distribution of the set of touch electrodes 130. With this configuration, the set of touch electrodes 130 can sense the capacitance value generated by the user's non-pressing operation on the keyboard overlay film 10, and then generate the corresponding touch signal.

It should be noted that although the set of touch electrodes 130 is evenly arranged on the key projection surface 105 and the key-gap space 103 in this embodiment, in other embodiments, the set of touch electrodes 130 may be arranged denser on the key projection surface 105 or only be arranged on the corresponding range of the key projection surface 105. In addition, although in this embodiment, the first electrode 136 and the second electrode 138 are rhombus-shaped and arranged in a staggered manner, in other embodiments, the first electrode 136 and the second electrode 138 can have other suitable shapes (for example, rectangular) or arrangement, and the present invention does not limit this.

Figure 7:
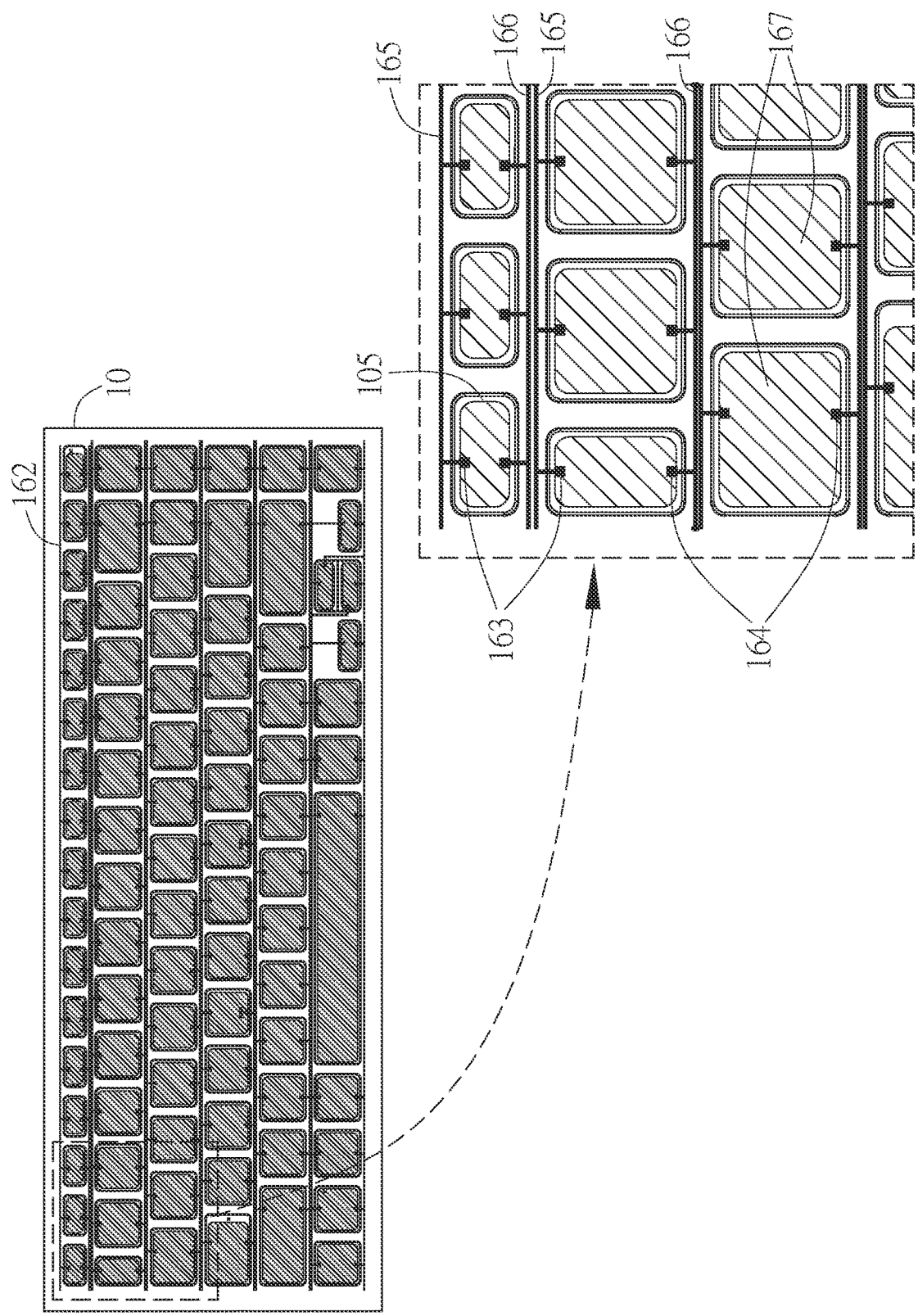
FIG. 7 is a schematic view of the backlight circuit of the keyboard overlay film according to an embodiment of the present invention.

Referring to FIG. 7 to illustrates the backlight layer 160 of the keyboard overlay film 10 according to an embodiment of the present invention. In this embodiment, the backlight layer 160 is composed of a backlight circuit 162, and includes a plurality of upper electrodes 163, a plurality of lower electrodes 164, a plurality of upper circuits 165, and a plurality of lower circuits 166. The plurality of upper electrodes 163 and the plurality of lower electrodes 164 are respectively distributed on the key projection surfaces 105, and each key projection surface 105 is distributed with only one upper electrode 163 and one lower electrode 164, wherein each upper circuit 165 of the plurality of upper circuits 165 is respectively connected to the plurality of upper electrodes 163 distributed on the key projection surfaces 105 of the same row, and each of the lower circuits 166 is respectively connected to the plurality of lower electrodes 164 distributed on the key projection surfaces 105 of the same row . In addition, a dielectric and electroluminescent material 167 (such as zinc sulfide) (shown as a shaded area in FIG. 7) is sandwiched between the upper electrode 163 and the lower electrode 164 on the same key projection surface 105. When current passes through the electroluminescent material, it generates a light, and the light emits through the light-transparent characters 122 of the shading layer 120, so that the user can recognize the characters on the keyboard overlay film 10 in an environment with insufficient light.

In another embodiment, between the upper electrode 163 and the lower electrode 164 in part of the key projection surface 105, it may include a color coating that is different from the electroluminescent material in the other key projection surface 105. When the current passes through the upper electrode 163 and the lower electrode 164, the color coating can generate a light in different color from that of the electroluminescent material. With this configuration, when the light emits through the light-transparent characters 122, the user can see the characters in different colors. For example, the electroluminescent material between the key projection surfaces 105 corresponding to the commonly used keys (such as W, A, S, D keys or position keys F and J) can be replaced with the color coating to facilitate the user to quickly distinguish the commonly used keys.

Figure 8:
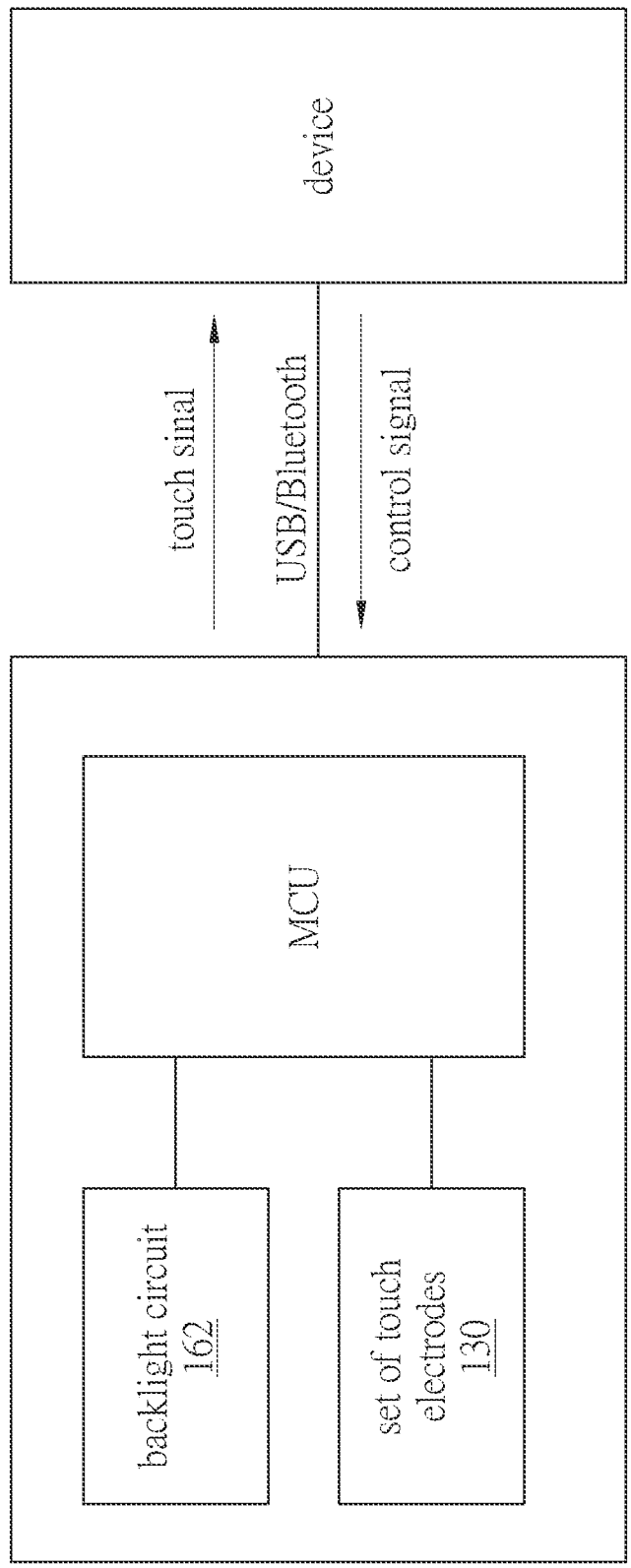
FIG. 8 is a block diagram showing the connection between the set of touch electrodes and the backlight circuit and the device according to an embodiment of the present invention.

Referring to FIG. 8 to illustrate the keyboard overlay film 10 according to an embodiment of the present invention, FIG. 8 is a schematic block diagram of the connection between the set of touch electrodes 130 and the backlight circuit 162 in the keyboard overlay film 10 and the device. The set of touch electrodes 130 and the backlight circuit 162 can be connected to a control IC (such as a micro control unit (MCU)) first, and then the control IC can be wired (such as a universal serial bus (USB)) or wireless (such as Bluetooth) to connect to the user's device (such as desktop computers, notebook computers, tablet computers, etc.), so as to input touch signals into the device. In some embodiments, the device can compare the touch signal input from the keyboard overlay film 10 with the text signal generated by the key of keyboard being pressed, in order to verify or calibrate the touch signal input from the keyboard overlay film 10. At the same time, the device can generate a control signal to the keyboard overlay film 10, and input the control IC through the wired or wireless connection. Through this configuration, the user can operate the device to enable or disable the touch function or backlight function of the keyboard overlay film 10. It should be noted that in different embodiments, the touch function and the backlight function of the keyboard overlay film 10 can be enabled by default, without the need to perform the activation operation through the device.

Figure 9:
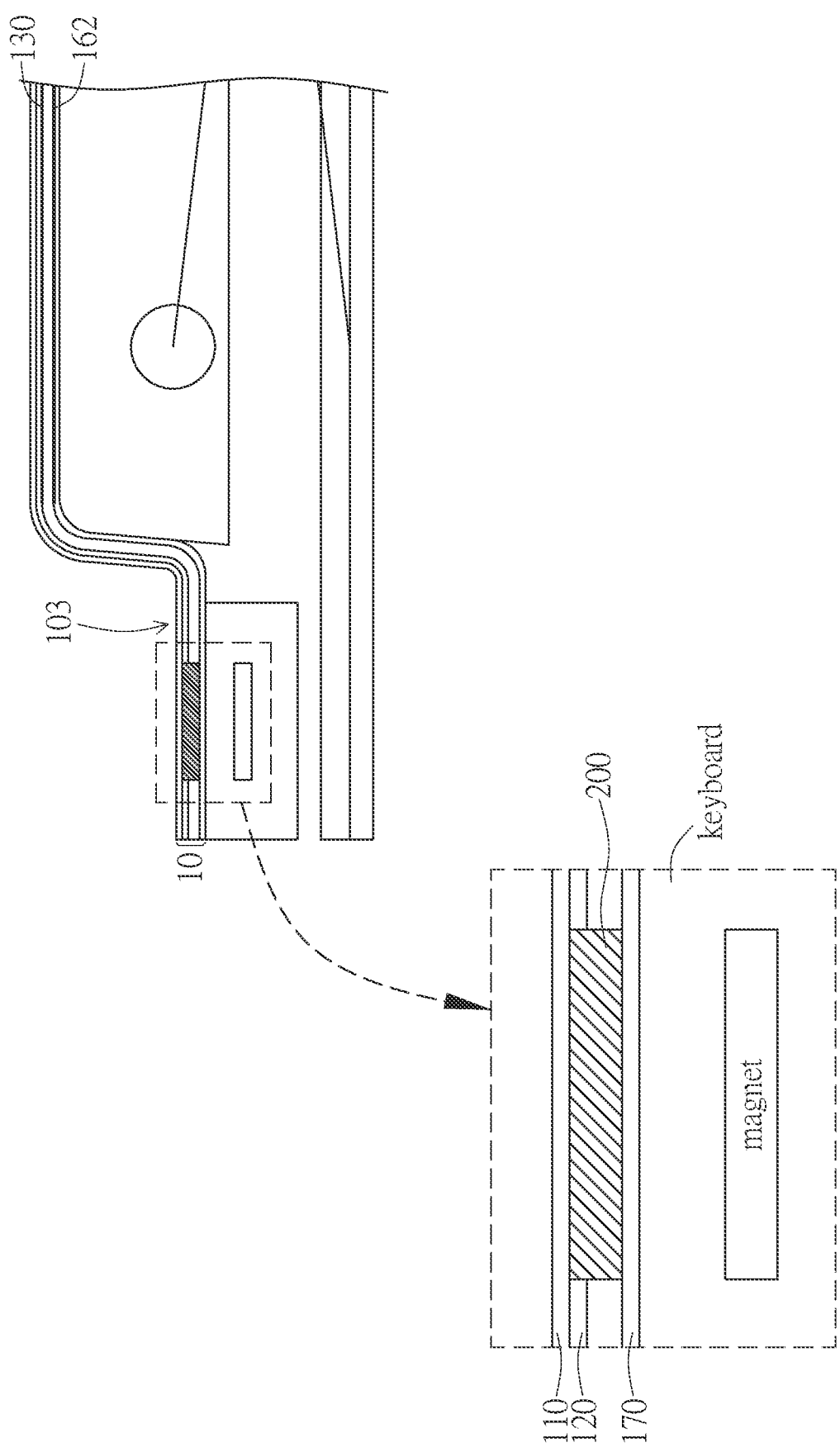
FIG. 9 is a schematic cross-sectional view of the portion of the keyboard overlay film containing a magnetic material according to another embodiment of the present invention.

Referring to FIG. 9, the keyboard overlay film 10 according to another embodiment of the present invention is illustrated. In this embodiment, the keyboard overlay film 10 includes a magnetic material 200 (for example, a magnet or iron, cobalt, nickel, etc., which can be attracted by a magnet) located between the top protective layer 110 and the lower protective layer 170, and is distributed in part of the key-gap space 103 where the set of touch electrodes 130 and the backlight circuit 162 are not distributed. The position where the magnetic material 200 is distributed can correspond to the magnets in the keyboard (the magnets may be arranged in the keyboard frame where no key is disposed). When the keyboard overlay film 10 is combined with the keyboard, the magnetic material 200 is attracted by the magnetic force of the magnets in the keyboard. The tightness between the keyboard overlay film 10 and the keyboard can be increased, and at the same time, the keyboard overlay film 10 can be prevented from sliding.

In different embodiments, the keyboard overlay film 10 may not include the backlight layer 160 and the set of touch electrodes 130 at the same time, and the keyboard overlay film 10 of these embodiments may respectively include different structures without including all the features described above. For example, in an embodiment, the keyboard overlay film 10 may only include the set of touch electrodes 130 and does not include the backlight layer 160 A character layer (at the same position as symbol 120 in FIG. 2) may be substituted for the shading layer 120, and the character layer is located on the side of the top protective layer 110 forming the keycap accommodating cavities 101. That is, the character layer is located on the side of the top protective layer 110 facing the lower protective layer 170. The character layer includes a plurality of light-transparent characters 122 respectively corresponding to the key projection surfaces 105 of the plurality of keycap accommodating cavities 101. The character layer can use any suitable coating which is unnecessary to have the light-shielding effect, and the light-transparent characters 122 are the characters without coating. In addition, in this embodiment, the set of touch electrodes 130 can be printed on the side of the character layer facing the lower protective layer 170, and the keyboard overlay film 10 does not need to include the insulating layer 140. The keyboard overlay film 10 may include a substrate layer (at the same position as symbol 140 in FIG. 2). The substrate layer is located between the side of the character layer opposite to the top protective layer 110 and the lower protective layer 170. That is, the substrate layer is located on the side of the character layer facing the lower protective layer 170 and between the character layer and the lower protective layer 170. The set of touch electrodes 130 is printed on a surface of the substrate layer, wherein the substrate layer can be any suitable material which is unnecessary to have an insulating effect. In the embodiment where the keyboard overlay film 10 only includes the backlight layer 160 and does not include the set of touch electrodes 130, the backlight circuit 162 can be printed on the side of the lower protective layer 170 facing the shading layer 120, and the keyboard overlay film 10 does not need to include the insulating layer 140. Similarly, the keyboard overlay film 10 may also include a substrate layer, which is located on the side of the shading layer 120 opposite to the top protective layer 110. That is, the substrate layer is located on the side of the shading layer 120 facing the lower protective layer 170. The backlight circuit is printed on a surface of the substrate layer, wherein the substrate layer can be any suitable material and does not need to have an insulating effect.

Figure 10:
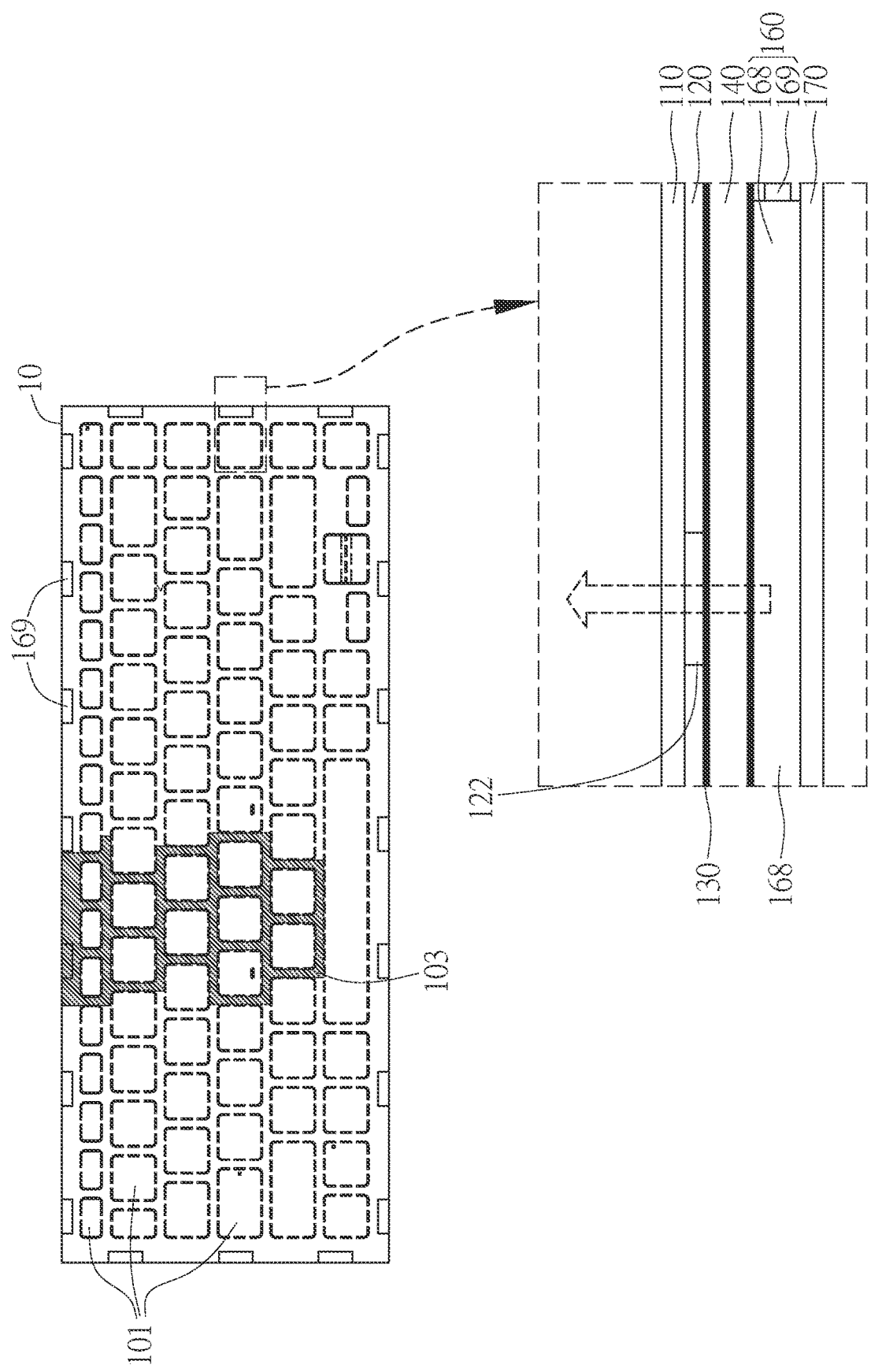
FIG. 10 is a schematic view of the keyboard overlay film including a light guide plate and a plurality of light sources according to another embodiment of the present invention.

In addition, in different embodiments, the backlight layer 160 may include a plurality of light sources 169 and the light guide plate 168 instead of the backlight circuit 162. As shown in FIG. 10, the light guide plate 168 and the plurality of light sources 169 are set up in the backlight layer 160, and the plurality of light sources 169 are arranged on the edge of the keyboard overlay film 10. It should be noted that the plurality of light sources should be sandwiched inside the keyboard overlay film 10, and the plurality of light sources 169 shown in FIG. 10 are only intended to illustrate their arrangement positions. The light from the plurality of light sources 169 is guided by the light guide plate 168 and then emitted toward the shading layer 120, and emitted through the light-transparent characters 122, so that the user can recognize the characters on the keyboard overlay film 10 in a dim environment. It should be noted that the configuration of the backlight layer 160 in the embodiments herein are all illustrative descriptions, and the backlight layer 160 may generate light in any other suitable ways (for example, direct-lit LEDs, etc.), which is not limited herein.

The content of the present invention has been described by the above-mentioned embodiments, but the above-mentioned embodiments are only for illustrative purposes and not for limitation. Those skilled in the art should understand that without departing from the spirit of the present invention, the structures and configurations in the foregoing embodiments may be increased, decreased, or changed as appropriate. The content of the present invention should include such changes, and is not limited to the embodiments cited herein.

What is claimed is:

1. A keyboard overlay film forming a plurality of keycap accommodating cavities and a key-gap space, the key-gap space surrounding the keycap accommodating cavities, the keycap accommodating cavities respectively including a key projection surface, wherein the keyboard overlay film includes:
   a top protective layer;
   a character layer located on a side of the top protective layer forming the keycap accommodating cavities, and the character layer includes a plurality of light-transparent characters respectively corresponding to the key projection surface of each of the keycap accommodating cavities;
   a set of touch electrodes located on a side of the character layer opposite to the top protective layer; and
   a lower protective layer located on a side of the set of touch electrodes opposite to the character layer.

2. The keyboard overlay film of claim 1, wherein the set of touch electrodes is printed on the side of the character layer opposite to the top protective layer.

3. The keyboard overlay film of claim 1, further comprising a substrate layer located between the character layer and the lower protective layer, wherein the set of touch electrodes is printed on a side of the substrate layer.

4. The keyboard overlay film of claim 1, wherein the set of touch electrodes is distributed within the keycap accommodating cavities and at least a portion of the key-gap space.

5. The keyboard overlay film of claim 1, wherein the set of touch electrodes is connected to a device by wired or wireless connection, and the device generates a control signal for the set of touch electrodes.

6. The keyboard overlay film of claim 1, further comprising an insulating layer and a backlight layer, wherein the insulating layer is located on the side of the set of touch electrodes opposite to the character layer, and the backlight layer is located between the insulating layer and the lower protective layer, wherein when the backlight layer provides light, the light emits through the light-transparent characters of the character layer.

7. The keyboard overlay film of claim 6, wherein the backlight layer includes a backlight circuit, the set of touch electrodes is printed on the side of the insulating layer facing the character layer, and the backlight circuit is printed on the other side of the insulating layer.

8. The keyboard overlay film of claim 6, wherein the set of touch electrodes and the backlight circuit are connected to a device by wired or wireless connection, and the device respectively generates a control signal for the set of touch electrodes and the backlight circuit.

9. The keyboard overlay film of claim 6, wherein the backlight layer includes a backlight circuit, the set of touch electrodes is printed on the side of the character layer opposite to the top protective layer, and the backlight circuit is printed on the side of the lower protective layer facing the insulating layer.

10. The keyboard overlay film of claim 1, further comprising a plurality of magnetic materials located between the character layer and the lower protective layer where the set of touch electrodes is not distributed, wherein when the keyboard overlay film is combined with a keyboard, the magnetic materials correspond to a magnet in the keyboard.

11. A keyboard overlay film forming a plurality of keycap accommodating cavities and a key-gap space, the key-gap space surrounding the keycap accommodating cavities, the keycap accommodating cavities respectively including a key projection surface, wherein the keyboard overlay film includes:
- a top protective layer;
- a shading layer located on a side of the top protective layer forming the keycap accommodating cavities, the shading layer including a plurality of light-transparent characters respectively corresponding to the key projection surfaces of the keycap accommodating cavities;
- a backlight layer located on a side of the shading layer opposite to the top protective layer, wherein when the backlight layer provides light, the light emits through the light-transparent characters of the shading layer; and
- a lower protective layer located on a side of the backlight layer opposite to the shading layer.

12. The keyboard overlay film of claim 11, wherein the backlight layer includes a backlight circuit printed on a side of the lower protective layer facing the shading layer.

13. The keyboard overlay film of claim 12, wherein the backlight layer is connected to a device by wired or wireless connection, and the device generates a control signal for the backlight layer.

14. The keyboard overlay film of claim 12, wherein the backlight circuit further includes a color coating, so that the part of the backlight circuit coated with the color coating generates a light in different color from other parts.

15. The keyboard overlay film of claim 12, wherein the backlight circuit includes:
- a plurality of upper electrodes and a plurality of lower electrodes distributed on the projection surface of the key-surface of the keycap accommodates spaces; and
- a plurality of upper circuits and a plurality of lower circuits, wherein each of the upper circuits is connected to the upper electrodes, and each of the lower circuits is connected to the lower electrodes.

16. The keyboard overlay film of claim 12, further including a plurality of magnetic materials located between the shading layer and the lower protective layer where the backlight circuit is not distributed, wherein when the keyboard overlay film is combined with a keyboard, the magnetic materials correspond to a magnet in the keyboard.

17. The keyboard overlay film of claim 11, further comprising a substrate layer located on the side of the shading layer opposite to the top protective layer, wherein the backlight layer includes a backlight circuit, and the backlight circuit is printed on the side of the substrate layer.

18. The keyboard overlay film of claim 11, wherein the backlight layer includes a plurality of light sources and a light guide plate.

19. The keyboard overlay film of claim 11, further comprising an insulating layer and a set of touch electrodes, wherein the backlight layer includes a backlight circuit, the insulating layer is located between the shading layer and the backlight layer, and the set of touch electrodes is located between the insulating layer and the shading layer.

20. The keyboard overlay film of claim 19, wherein the set of touch electrodes is printed on the side of the insulating layer facing the shading layer, and the backlight circuit is printed on the other side of the insulating layer.

* * * * *